Jan. 25, 1966    R. J. HOLTON    3,230,591
FASTENING DEVICE

Filed Jan. 2, 1962    6 Sheets-Sheet 1

INVENTOR.
ROBERT J. HOLTON

BY
Teare, Felzer & Teare
ATTORNEYS

Jan. 25, 1966 R. J. HOLTON 3,230,591
FASTENING DEVICE

Filed Jan. 2, 1962 6 Sheets-Sheet 2

INVENTOR.
ROBERT J. HOLTON

BY
Teare, Fetzer & Teare
ATTORNEYS

INVENTOR.
ROBERT J. HOLTON

Jan. 25, 1966   R. J. HOLTON   3,230,591
FASTENING DEVICE

Filed Jan. 2, 1962   6 Sheets-Sheet 4

INVENTOR.
ROBERT J. HOLTON

BY
Teare, Telzer & Teare
ATTORNEYS

Jan. 25, 1966  R. J. HOLTON  3,230,591
FASTENING DEVICE

Filed Jan. 2, 1962  6 Sheets-Sheet 6

INVENTOR.
ROBERT J. HOLTON
BY
Teare, Teare & Teare
ATTORNEYS

United States Patent Office 3,230,591
Patented Jan. 25, 1966

1

3,230,591
FASTENING DEVICE
Robert J. Holton, Cleveland, Ohio, assignor to Tinnerman Products, Inc., Cleveland, Ohio, a corporation of Ohio
Filed Jan. 2, 1962, Ser. No. 163,938
17 Claims. (Cl. 24—73)

This invention relates in general to fastening means for drums, barrels and other such containers and deals more particularly with fastening devices for holding in place the removable cover or lids for such containers to prevent accidental or unintended opening of covers or lids of the container during handling, or the like.

In preparing tobacco or other such ingredients for shipment, containers such as tobacco hogsheads formed of kraft paperboard or the like are utilized and provided with removable covers or lids made of paper coated plywood or the like. It is necessary or required, in such cases, that the containers be sealed positively against accidental opening or other such displacement of the covers or lids. In the past, difficulties have arisen when utilizing larger containers with correspondingly larger covers or lids because of the tendency for the larger surface areas to buckle or twist due to accidental or unintended presures exerted against the walls of the containers when handled and prepared for shipment.

The fasteners of the present invention are especially advantageous for securing covers or lids on containers in which only a relatively small area is available for attaching the fasteners, or when the fasteners must be attached in small, close quarters as required in many such assemblies wherein space is at a premium. In this regard, the fasteners of the present invention comprise economical sheet metal supporting clips which are readily provided for attachment to the desired containers and together with locking clips are adapted to retain the fasteners in applied position against accidental removal, shifting or displacement of the covers or lids when in the applied position therebetween.

In other forms of the present invention the fastening devices are extremely useful in retaining the flat sheets of kraft paperboard or the like as they are formed into a cylindrical container, such as a tobacco hogshead, which has, heretofore, presented difficulties due to the tendency of the flat sheets to fly apart before they could be secured into cylindrical form by suitable straps, cords or the like. In this regard, the fasteners of the present invention are additionally useful in providing a quick and efficient means for retaining reinforcing strips of kraft paperboard or the like, that are provided around the outer surface of cylindrical tobacco hogsheads or the like to strengthen the same when prepared for shipment or during other such handling.

A primary object of the present invention, therefore, is to provide a simple, inexpensive construction for fasteners of this character which are adapted to be readily secured over the rim of a cylindrical container or the like in the applied position to retain the cover or lid thereon, and which fasteners are adapted for positive self-locking in such applied position to prevent accidental opening or removal of the cover or lid.

Another object of the present invention is to provide construction for sheet metal fastening devices of the kind described which are formed as inexpensive one or two piece clips having integral locking means adapted for automatic self-locking action when in predetermined applied position on the rim portions of a cylindrical tobacco hogshead or the like in a manner which prevents losening of the clips from the applied position and positively retains the covers or lids in closed position thereon.

2

A further object of the present invention is to provide fastening means of the kind described to be efficiently utilized in conjunction with supporting straps or the like that extend from and between opposed fastening devices when in the applied position on the rim portions of a cylindrical tobacco hogshead, or the like, and which extend through intermediate fastening means when in applied position on the cover or lid and in a manner to prevent twisting or buckling of the cover or lid when positioned on a cylindrical tobacco hogshead or the like.

A still further object of the present invention is to provide fastening means of the kind described for quickly and efficiently retaining in the applied position flat sheets of kraft paperboard or the like when formed into cylindrical tobacco hogsheads or the like.

An additional object of the present invention is to provide fastening means that are useful in providing a positive locking for reinforcing strips of kraft paperboard or the like that are positioned around cylindrical tobacco hogsheads or the like when prepared for shipment.

Further objects and advantages and other new and useful features in the construction, arrangement and combination of elements of the fastening devices of the invention will be readily apparent as the following description proceeds with reference to the accompanying drawings, for purposes of illustration but not of limitation, in which like reference characters designate like parts throughout, and in which:

FIG. 21 is an enlarged side elevational view partly in section showing another form of the fastening device of the present invention as seated in an automatic self-locking action in applied position retaining the cover or lid in closed position on the cylindrical tobacco hogshead or the like;

FIG. 24 is an enlarged side elevational view partly in section showing another form of the fastening device of the present invention as seated in an automatic self-locking action in applied position retaining the cover or lid in closing position on the cylindrical tobacco hogshead or the like;

FIG. 27 is a top perspective view of another form of the invention showing the fastening device as a single unit and including a dart-like leg for penetration into locking engagement with the cylindrical tobacco hogshead or the like;

FIG. 28 is an enlarged side elevational view partly in section showing the fastening device of FIG. 27 seated in automatic self-locking action in applied position retaining the cover or lid in closing position on the cylindrical tobacco hogshead or the like;

FIG. 29 is a top perspective view of another form of the invention showing a fastening device utilized in retaining flat sheets of kraft paperboard or the like when formed into cylindrical tobacco hogsheads or the like;

FIG. 30 is an enlarged side elevational view partly in section showing the fastening device of FIG. 29 clamped in automatic self-locking action in applied position retaining the flat sheets of kraft paperboard or the like when formed into cylindrical tobacco hogsheads or the like;

FIG. 31 is a top perspective view of another form of the invention showing a fastening device utilized in retaining the end portions of reinforcing strips positioned around the exterior surface of a cylindrical tobacco hogshead or the like;

FIG. 32 is an enlarged side elevational view showing the fastening device of FIG. 31 retaining in automatic self-locking action in applied position the end portions of reinforcing strips utilized in strengthening the outer surfaces of cylindrical tobacco hogsheads or the like.

Although the invention is shown herein as fastening covers or lids to a cylindrical tobacco hogshead or the like it will be understood that the invention may be utilized in securing covers or lids to various containers wherein it is desired to quickly and positively secure such covers or lids to such containers.

Figure 1:
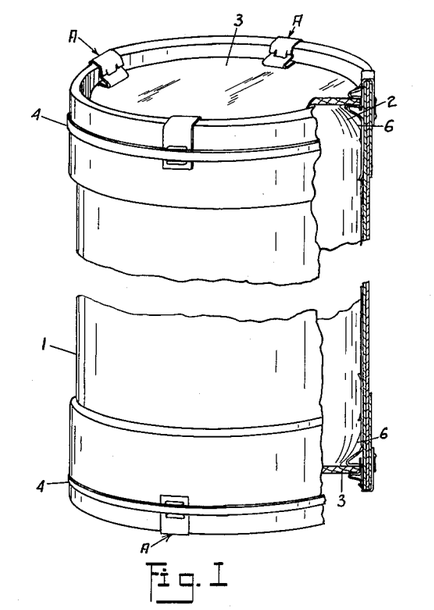
FIG. 1 is a top perspective view from the front of a cylindrical tobacco hogshead or the like showing a plastic bag or the like within the cylindrical tobacco hogshead containing tobacco or other such ingredient and a removable cover or lid retained thereon by the fastening means of the present invention.

Referring to the drawings, FIG. 1 illustrates a cylindrical tobacco hogshead or container 1 of conventional commercial construction made preferably of a material such as paper, cardboard, corrugated board, kraft paperboard or the like, which may be provided with removable top and bottom lids 3, preferably made of a material, such as, paper coated plywood or the like and which are retained in closed position within the container 1 by the fastening devices, shown generally at A, in one form of the invention. The fastening devices A are preferably secured in locked position over the rim portions of the container 1 at suitable spaced points around the circumference thereof. As shown in FIG. 1, the container 1 is constructed with a hollow body portion 2 which may be attained by forming the material of the container into a cylindrical shape and securing it therein by means of suitable straps 4 positioned around the body of the container and secured by the fastening devices A of the invention. Additional straps 6 may be secured to the fastening devices A from the interior of the container 1 and adapted to extend between opposing pairs of the fastening devices A, to thereby retain the fastening devices on the sides of the container or to prevent distortion or buckling of the top and bottom lids 3, as will be discussed in further detail subsequently.

Figure 2:
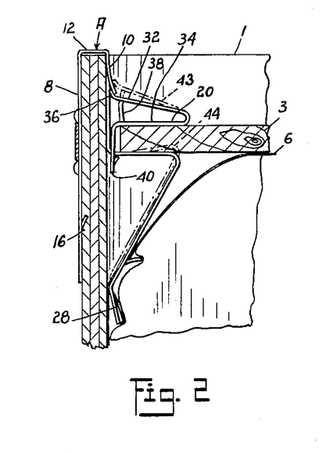
FIG. 2 is an enlarged side elevational view partly in section showing in edge elevation the fastening device as seated in an automatic self-locking action in applied position retaining the cover or lid in closed position on the cylindrical tobacco hogshead or the like and showing the interior supporting straps extending from the inner leg of said fastening device.
Figure 3:
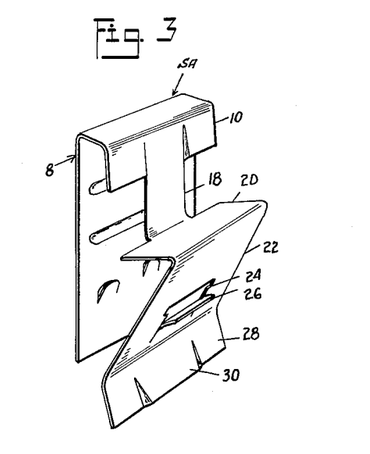
FIG. 3 is a top perspective view of one form of the invention showing the supporting clips per se employed in FIGS. 1 and 2.
Figure 4:
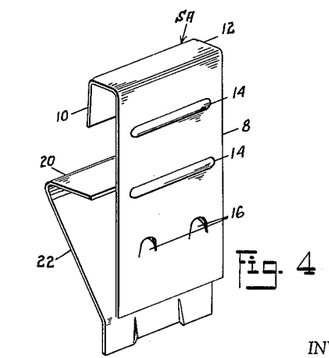
FIG. 4 is a top perspective view of the supporting clip of FIG. 3 showing its back side.

The fastening devices A in one form of the present invention are adapted for economical quantity production from a standard sheet metal strip with little waste and may be fabricated from any suitable sheet metal material preferably of a spring-like nature, such as spring steel or cold rolled metal having spring-like characteristics. As shown in FIGS. 2 to 5 inclusive, the fastening devices A, in one form of the invention may comprise a supporting clip SA and a locking clip LA, shown best in assembled relation at FIG. 2, which may be formed from suitable sheet strips into a generally U-shaped configuratiton. The U-shaped supporting clip SA may be bent to define a pair of spaced resilient arms 8 and 10 extending downwardly and generally normally from a flat base or bridge portion 12, wherein the spacing between the arms and the base or bridge portion 12 approximates generally a thickness in horizontal cross section of the rim portion of the container 1. The shorter or outer arm 8 may be provided with a pair of longitudinally extending ribs or raised portions 14 which are adapted to secure the outer straps 4 against slipping, when positioned circumferentially about the container 1. The lower end of the arm 8 may be provided with inwardly extending tab portions 16 which act to secure the supporting clips SA by penetration into the material of the container 1. The resilient arm, as shown generally at 10, includes a downwardly extending shank portion 18 intermediate its ends and of lesser width in horizontal cross section, to thereby form a generally T-shaped configuration therewith. The shank portion 18 is bent adjacent its lower extremity normally outwardly to form a generally planar supporting shoulder 20, of a width approximating that of the resilient arm 8. The supporting shoulder 20 is bent along its outer edge in the form of a resilient leg 22 which extends downwardly and angularly inwardly toward the lower extremity of the resilient arm 8 and in proximity therewith, sufficient to resiliently grip the wall of the container 1 therebetween. The resilient leg 22 may be formed with a slit portion 24 and an outwardly curved tab portion 26 adapted to receive therethrough one of the supporting straps 6, as best shown at FIG. 2.

To secure a further frictional engagement with the wall of the container 1, the resilient leg 22 may be formed with a flange 28, which is bent downwardly commencing at a point opposite the lower edge of the resilient arm 8 and extending beyond said point generally parallel to the resilient arm 8. The flange 28 may be formed at its lower extremity with a strap receiving depression 30 located intermediate its edge portion and adapted to secure one of the supporting straps 6 therethrough in frictional engagement with the wall of the container 1. In some cases, it may be desirable to form the flange 28 so that it extends downwardly and angularly outwardly away from the resilient arm 8, to afford an even greater frictional engagement of the strap 6 with respect to the wall of the container 1, best shown at FIG. 3.

Figure 5:
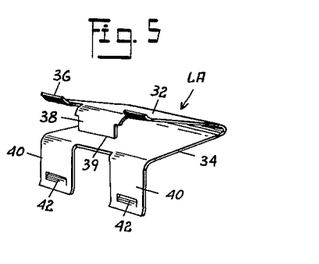
FIG. 5 is a top perspective view of one form of the invention showing the locking clip per se employed in conjunction with the supporting clips in FIGS. 1 and 2.

The locking clip LA in this form of the invention, to be assembled with the supporting clip SA in sealing a cover on a container, may be of a U-shaped configuration, as shown at FIG. 5. The locking clip LA is bent to define a pair of resilient arms 32 and 34 which extend angularly outwardly away from one another throughout their length. The arm 32 is provided at its end with a pair of upstanding detent portions 36 and a cutout flange portion 38 which serve as combination spacing and abutment means for the locking clip LA when it is assembled with the supporting clip SA. In this assembled relation, the flange portion 38 extends downwardly and generally parallel to the shank portion 18 of the supporting clip SA. The resilient arm 34 may be formed adjacent its end with two spaced apart leg portions 40 which extend in the same general direction as the flange portion 38 on the resilient arm 32 and which act as spacing and abutment means when the locking clip LA is assembled on the supporting clip SA, as best shown in FIG. 5. The leg portions 40 may be additionally formed with outwardly extending tab portions 42 which act to prevent upward movement of the locking clip LA, when assembled on the supporting clip SA.

A typical application of the fastening devices, in one form of the invention, is shown at FIG. 2 wherein the supporting clips SA and the locking clips LA are assembled on the rim of a container 1 to retain the cover 3 in closed position therebetween against accidental or unintended opening. As many fastening devices A as are necessary may be employed, with each fastening device being independently secured by the automatic self-locking action of the supporting clip SA and locking clip LA when assembled together. Each supporting clip SA may be easily and quickly applied on the container 1 by placing the resilient arms 8 and 10 on either side of the container rim with the bridge portion 12 of the clip resting on the upper surface of the rim. The tab portion 16, on the arm 8, will thus penetrate the outer surface of the container and with the resilient flange 28 of the arm 10 will frictionally secure the supporting clip SA at a predetermined position within the container 1. The cover 3 may then be placed within the container 1 and supported by the planar surface of the inwardly projecting shoulder 20. The locking clip LA may then be assembled on the supporting clip SA and over the cover 3 by inserting the leg portions 40 downwardly between the inner wall of the container 1 and the edge of the cover 3, wherein the resilient arm 34 extends inwardly across the top of the cover 3. It can be seen that the bottom edge 39 of the flange portion 38 is limited in its downward movement by engagement with the resilient arm 34 thus preventing permanent deformation of the resilient arm 32 should too great a pressure be applied thereon when assembling the locking and supporting clips. The cover 3 may then be locked in positive fixed relation by exerting a downward force on the resilient arm 32 which moves the arm on the position illustrated by the dotted line 43, to thereby snap the upstanding detent portion 36 of the arm into engagement with the supporting clip SA on either side of the shank portion 18. As will also be noted at FIG. 2, when a downward force is exerted on the resilient arm 32 of the locking clip LA, a corresponding force is exerted on the cover 3 to thereby move the upper surface of the planar shoulder 20 from its original position when assembled on a container 1, as illustrated by the dotted line 44. In another form, the required number of upper and lower fastening devices are secured on the edge of the kraft paperboard and connected in pairs by the straps 6 whereby the covers are then positioned thereon so that the entire unit may be rolled into a desired hogshead. In either case, with this construction the cover 3 is positively locked in the applied position by the self-locking action of the resilient arms 32, 34 and the abutting relation of the planar supporting shoulder 20 of the supporting clip SA, such that there is little possibility of loosening or displacement of the cover 3 when in such locked position.

Figure 6:
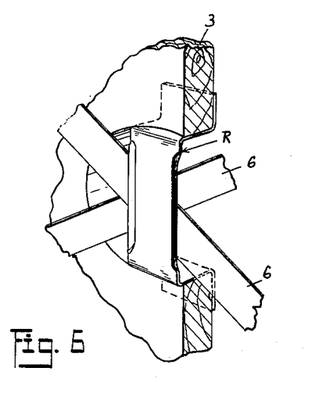
FIG. 6 is a side elevational view showing in edge elevation the tie-in arrangement of the reinforcing and fastening devices wherein each complete band of an interior supporting strap interconnects four fastening devices.
Figure 6A:
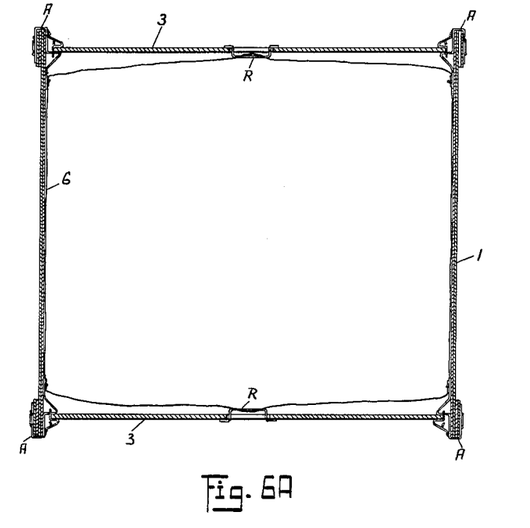
FIG. 6a is a perspective view of one form of the invention showing the under surface of a cover or lid illustrated in FIG. 6 with a reinforcing means in applied position depending from a hole in the cover or lid and positively locking interior supporting straps therein.
Figure 7:
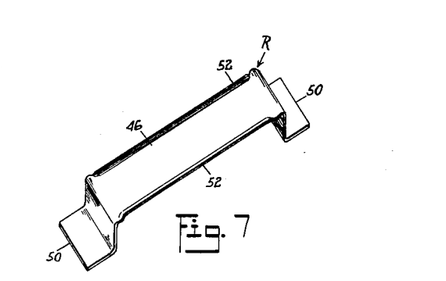
FIG. 7 is a top perspective view showing the fastening device in FIG. 6.

To prevent axial distortion or buckling of the covers 3, reinforcing clips R may be provided which extend from a slot or hole formed in each of the covers 3, as best shown at FIGS. 6, 6a and 7. The reinforcing clips R are of a generally U-shaped configuration defining an elongated flat base portion 46 with two depending leg portions 48 extending normally from said base portion and provided with outwardly extending flanges 50 which extend generally in the same direction or parallel to the base portion 46. When applied to the container 1, a hole is formed in each of the covers 3 to receive the reinforcing clips R which are supported within the hole by means of the outwardly extending flanges 50 which engage the upper surface of the covers 3. The base portion 46, of each reinforcing clip R, extends downwardly below the under surface of the cover 3 a sufficient distance to receive in supporting relation straps 6 which extend upwardly from the fastening devices located around the rim of the container 1. In this manner, the straps 6 may extend from opposed fastening devices and crisscross on the base portion 46 of the reinforcing clips R to thereby prevent axial distortion or buckling of the covers 3 due to the opposing tension provided from the straps 6. In such case, each complete band of the interior supporting straps in conjunction with the reinforcing clips R would interconnect four fastening devices, as shown in FIG. 6a. The reinforcing clips R may be formed with longitudinally extending ribs 52 to reinforce the base portion 46 in that area.

Figure 8:
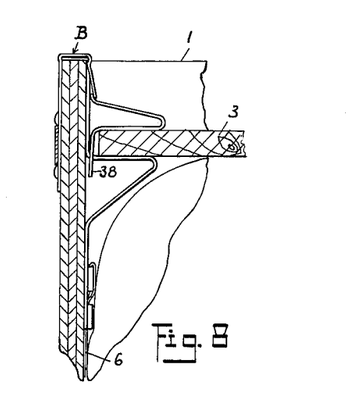
FIG. 8 is an enlarged side elevational view partly in section and showing in edge elevation the fastening device as seated in an automatic self-locking action in applied position retaining the cover or lid in closed position on the cylindrical tobacco hogshead or the like and showing interior supporting straps extending from the inner leg of said fastening device.
Figure 9:
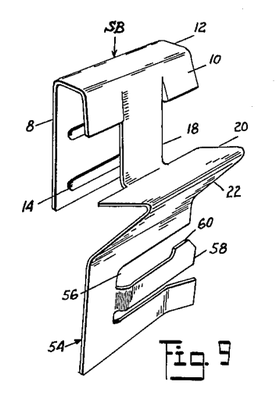
FIG. 9 is a top perspective view of another form of the invention showing the supporting clips per se as employed in FIG. 8.
Figure 10:
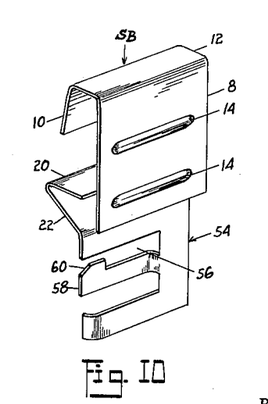
FIG. 10 is a top perspective view of the supporting clips of FIG. 9 showing its back side.

FIGS. 8 to 14, inclusive, disclose another form of the present invention which is similar in purpose, function and use to that disclosed with reference to the aforementioned figures. In this form of the invention, shown generally at B, the fastening device may comprise a similar supporting clip SB and a locking clip LB, shown in assembled relation at FIG. 8, which may be of a generally U-shaped configuration. As shown in FIGS. 9 and 10, the supporting clip SB, in this form of the invention, may comprise similar resilient arms 8 and 10 extending generally downwardly and normally from the flat base or bridge portion 12, the spacing between the arms again approximating generally the thickness of the container rim. The shorter arm 8 is provided with similar longitudinally extending ribs 14 which act to secure the outer supporting straps 4 against slipping. The resilient arm 10 may include a similarly downwardly extending shank portion 18 intermediate its ends and of a lesser width in horizontal cross section, to thereby form a generally T-shaped configuration therewith. The shank portion 18 is similarly bent adjacent its lower extremity normally outwardlly to form a generally planar supporting shoulder 20, of a width approximating that of the resilient arm 8. The supporting shoulder 20 is similarly bent to form the leg 22 which extends downwardly and angularly inwardly, but in this form, the leg extends below the lower extremity of the resilient arm 8 and in proximity therewith sufficient to resiliently grip the wall of the container 1 therebetween.

Figure 9A:
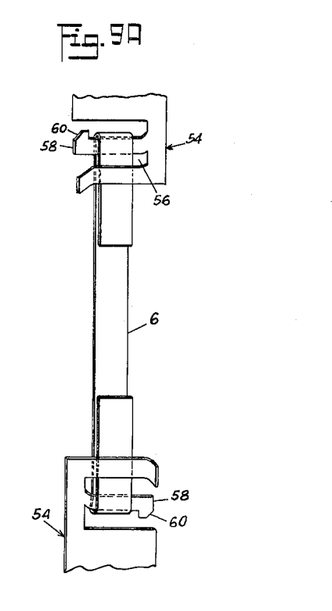
FIG. 9a is a perspective view partly in section showing in pair the supporting clips of FIG. 9 as being in self-locking engagement with an interior supporting strap.

In this form, to further secure frictional engagement with the container wall, the resilient leg 22 may be formed with a buckle-like flange 54, which is bent downwardly commencing at a point below the lower extremity of the resilient arm 8 and extending downwardly beyond said point generally parallel to the resilient arm 8. The buckle-like flange 54 may be provided with a slot 56 opening from one end of the flange and having a resilient buckle-like arm 58 extending transversely across the flange thereby bisecting the slot 56. The resilient buckle-like arm 58 may be provided with a projection 60 which acts to hold the interior straps 6 in frictional engagement therein and prevents longitudinal displacement of the straps 6 when engaged by the buckle-like flange 54. As shown in FIG. 9a, the buckle-like flange 54 in conjunction with the arm 58 provides a self-locking arrangement with respect to the interior supporting straps 6 which are looped around the arm 58 and held in frictional engagement therein between opposed pairs of the fastening devices. Such an arrangement eliminates the need for additional clamping means for securing the free ends of the interior supporting straps 6, as will be more fully discussed with respect to FIGS. 11 and 11a.

Figure 11:
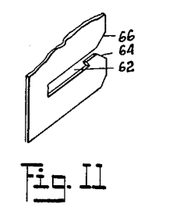
FIG. 11 is a partial top perspective view of the supporting clip of FIG. 9 showing a modification of the inner buckle-like strap supporting arm.
Figure 11A:
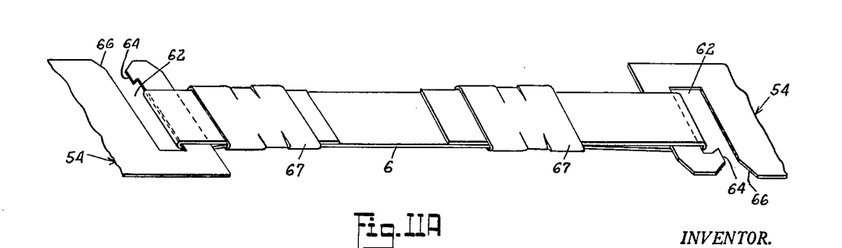
FIG. 11a is a perspective view partly in section showing in pair the supporting clips of FIG. 11 in locking engagement with an interior supporting strap.

FIGS. 11 and 11a illustrate a variation of this form of the invention, wherein the buckle-like flange 54 is shown absent the buckle-like arm and is formed merely with a slot 62 which opens outwardly into the edge of the flange. The slot is formed corresponding in size to the dimension of the supporting straps 6 to be inserted therein. Similarly, the flange is provided with a projection 64 to prevent transverse movement of the straps from within the slot when in the applied position. It is preferable to taper the openings into the slot, as at 66, to facilitate insertion of the strap 6 therein. As shown in FIG. 11a, the buckle-like flange 54, in the modified form, when connecting opposed pairs of fastening devices does not provide the self-locking arrangement as in the case where the buckle-like arm 58 provides a frictional engagement with the interior supporting straps 6. In this form, the interior supporting straps are merely looped through the slot 62 formed in each of the buckle-like flanges 54 and secured at their ends by means of a suitable clamping device 67.

Figure 12:
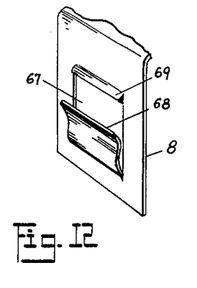
FIG. 12 is a partial top perspective view of the supporting clip of FIG. 9 showing a modification of the outer strap retaining arm.
Figure 13:
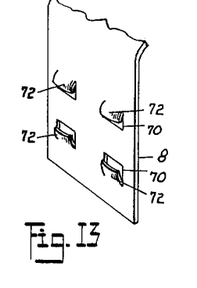
FIG. 13 is a partial top perspective view of the supporting clip of FIG. 9 showing another modification of the outer strap retaining arm.

FIGS. 12 and 13 illustrate another variation of this form of the invention, wherein the resilient arm 8 may be provided adjacent its upper end with a slot portion 67 and a resilient generally S-shaped arm 68 which is bent outwardly and adapted to receive exterior supporting straps 4 therein. The slot portion 67 is formed at its upper end with a downwardly extending louvered portion 69 adapted to coact with the S-shaped arm 68 for locking the exterior supporting straps 4 against upward movement thereof. FIG. 13 shows the resilient arm 8 as provided with four slot 70 and tab portions 72, positioned as opposed pairs, to secure the exterior supporting straps 4 therebetween.

Figure 14:
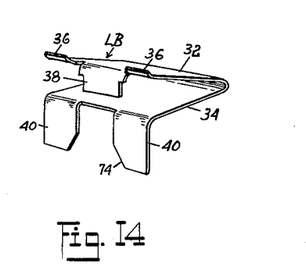
FIG. 14 is a top perspective view of another form of the locking clip per se employed in conjunction with the supporting clip in FIG. 8.

The locking clip LB, in this form of the invention, as shown at FIG. 14, is of a generally U-shaped configuration defining similar pairs of resilient arms 32 and 34 which extend angularly outwardly from one another throughout their length. The arm 32 is similarly formed with a pair of upturned detent portions 36 adjacent its end and a cut-out flange portion 38 intermediate the detent portions 36 which serve together as spacing means, when the locking clip LB is assembled on a supporting clip SB, as aforementioned. In this form of the locking clip LB, the spaced apart leg portions 40, which extend in the same general direction as the flange portion 38, are formed without the tab portions 42 but are formed instead with tapered corners, as at 74, to facilitate engaging the locking clip LB around the shank portion 18 of the supporting clip SB when in assembled relation.

Application of this form of the invention for locking the cover 3 within the container 1, as shown at FIG. 8, is substantially the same as that described with respect to the aforementioned figures.

Figure 15:
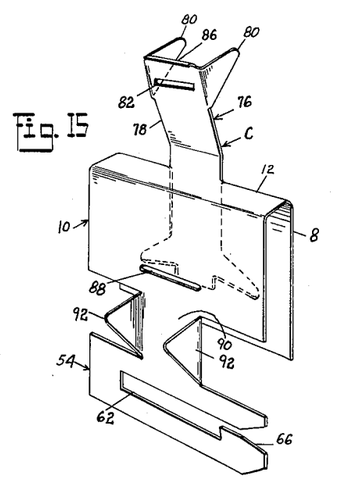
FIG. 15 is a top perspective view of another form of the fastening device of the invention showing the locking clip as being made integral with the supporting clip.
Figure 16:
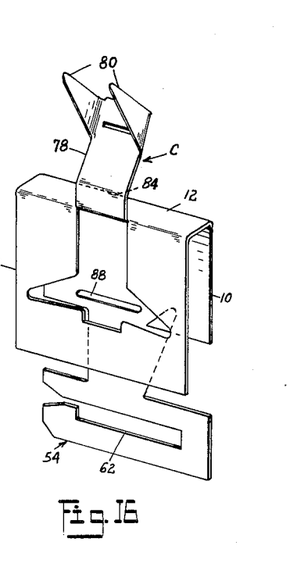
FIG. 16 is a top perspective view of the fastening device of FIG. 15 showing its back side.

FIGS. 15 and 16 disclose another form of the invention which is correspondingly similar in purpose, function and use to that disclosed with reference to the aforementioned figures. In one variation of this form of the invention, shown generally at C, the fastening devices may be formed of generally U-shaped configuration defining similar pairs of resilient arms 8 and 10 extending downwardly and normally from the flat base or bridge portion 12 with suitable spacing between the arms, as aforementioned. In this case, a generally T-shaped portion 76 may be cut or stamped out of the face of the longer or outer resilient arm 8. As shown at FIGS. 15 and 16, the T-shaped portion may comprise an elongated body portion 78 extending from the bridge portion 12 and a pair of triangular shaped ears 80 which are bent upwardly and parallel to each other and normally with respect to the elongated body portion 78. Body portion 78 may be provided adjacent its upper ends with an elongated slot 82 extending longitudinally and intermediate the triangular ears 80 which acts to receive a tool, such as a screw driver, to bend the body portion of the T-shaped flange into locking engagement with the cover 3. The body portion 78 of a T-shaped flange will bend naturally over the bridge 12, as represented by the dotted line at 84, when pressure is applied by means of the tool to force the body portion 78 downwardly into contact with the resilient arm 8. Body portion 78 may additionally be provided on its upper edge with a crimped portion 86 which curves upwardly and downwardly, as best shown at FIG. 15, and which is adapted to engage a corresponding slot 88 formed in the resilient arm 10, thereby locking the triangular flanges 80 over the cover 3 when bent into engagement by means of a suitable tool. The resilient arm 10 may include a shank portion 90, of lesser width in horizontal cross section, extending downwardly in the same direction therewith. The shank portion may be provided with two triangular supporting flanges 92 which are bent parallel to one another and normally with respect to the shank portion 90. The upper surface of the triangular supporting flanges 92 are generally coplanar with the under surface of the cover 3 when the latter is locked in position within the container 1. The resilient arm 10 may further be provided with a buckle-like arm 54, when it is desired to extend the interior supporting straps 6 between pairs of upper and lower fastening devices, as shown at FIG. 1, for retaining said devices on the sides of the container. When it is desired to prevent buckling of the cover 3, the buckle-like flange 54 may be used in conjunction with the reinforcing clips R, as aforementioned with respect to FIGS. 6, 6a and 7.

Figure 17:
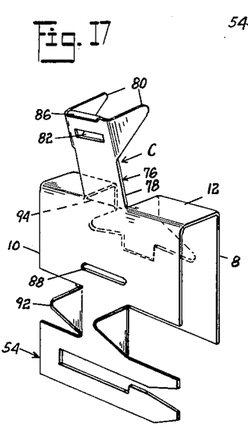
FIG. 17 is a top perspective view of the fastening device of FIG. 15 showing a modification of the locking clip.
Figure 18:
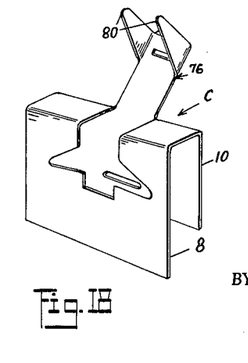
FIG. 18 is a top perspective view of the fastening device in FIG. 17 showing a modification of the supporting clip without the inner buckle-like strap retaining arm.
Figure 19:
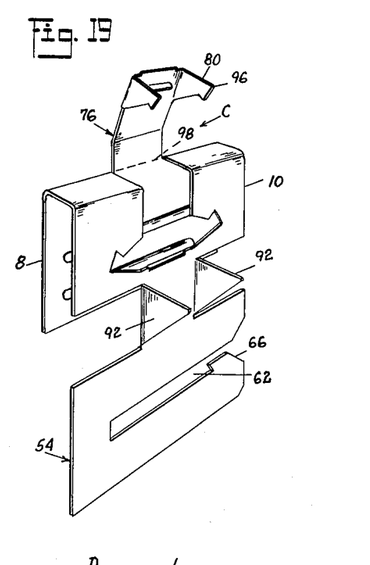
FIG. 19 is a top perspective view of another form of the fastening device of the present invention again showing the locking clip as being made integral with the supporting clip.
Figure 20:
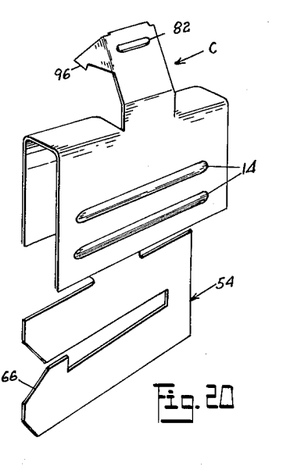
FIG. 20 is a top perspective view of the fastening device in FIG. 19 showing its back side.

FIGS. 17 through 20, inclusive, illustrate other variations in this form of the invention. FIG. 17 shows a similar sturctural arrangement with the T-shaped portion 76 cut or stamped out of the outer resilient arm 8 but with a portion of the elongated body 78 cut or stamped out of the bridge portion 12. In this variation, the triangular flanges 80 on the elongated body 78 are bent over along the dotted line at 94 and are similarly locked in position over the cover 3 by securing the crimped portion 86 within the elongated slot 88 formed in the resilient arm 10. FIG. 18 shows a similar variation of this form of the fastening device absent the buckle-like arm 54, for securing the interior straps to the cover 3. FIGS. 19 and 20 show still another variation of this form of the invention wherein the T-shaped portion 76 is stamped or cut from the resilient arm 10 and a bridge portion 12 of the U-shaped fastening device. In this case, the triangular flanges 80 may be formed with upstanding projections 96 whose outer edges taper generally downwardly and inwardly to fit tightly against the outer surface of the resilient arm 10 when the T-shaped portion is bent over and downwardly along the dotted line 98 into locking engagement with the cover 3. In this manner, the cover 3 is positively secured within the container 1 by the frictional engagement between the upper planar surfaces of the supporting flanges 92 and the projections 96 of the T-shaped locking portion 76.

Figure 21:
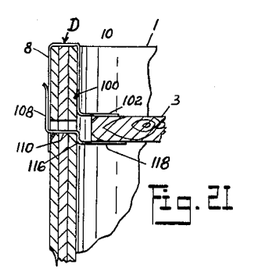
Figure 22:
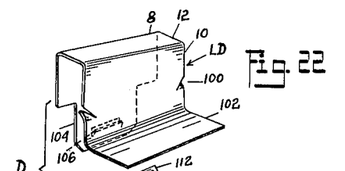
FIG. 22 is a top perspective view of the locking clip employed in FIG. 21.
Figure 23:
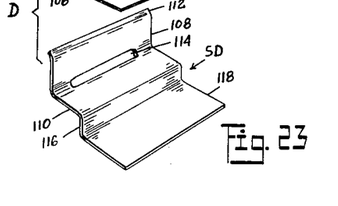
FIG. 23 is a top perspective view of the supporting clip employed in conjunction with the locking clip in FIGS. 21 and 22.

FIGS. 21 through 23, inclusive, show another form of the invention which is correspondingly similar in purpose, function and use to that disclosed with reference to the aforementioned figures. In this form of the invention, shown generally at D, the fastening device may comprise a generally U-shaped locking clip LD and a generally angular or stepped supporting clip SD. The U-shaped locking clip LD may again comprise a flat planar bridge portion 12 and two resilient leg portions 8 and 10 bent downwardly and normally from the bridge portion 12. The inner resilient arm 10 may comprise two indent portions 100 that project inwardly toward the surface of the resilient leg 8 which are adapted to penetrate the wall of the container 1, thereby preventing lateral movement of the locking clip LD when positioned on the rim of the container 1. The inner leg 10, as shown, is further formed with a generally flat planar flange 102 that extends outwardly and normal from the face of the resilient arm 10 and which extends over the cover 3, as shown at FIG. 22. The outer resilient arm 8, in this form of the invention, is provided with a neck portion 104 of lesser dimension in horizontal cross section and which is formed adjacent its lower end with an inwardly extending tab portion 106. The neck portion 104, with its corresponding tab portion 106, acts to secure the locking clip L to the supporting clip S as will, hereinafter, be discussed.

The supporting clip SD, as shown at FIG. 23, may be formed as a double step configuration from any suitable sheet metal strip. A first vertical upstanding wall portion 108 is formed with an angularly extending flange 112 which projects outwardly when assembled on the wall of the container 1. The vertical upstanding wall is bent outwardly adjacent its lower extremity to form a first planar step 110 which extends generally normally from the vertical wall a distance which corresponds generally to the thickness of the container wall. A horizontally extending slot 114, of a width sufficient to receive the neck portion 104 of the locking clip LD, is formed at the first bend between the vertical wall and the first planar step 110. The first planar step 110 is bent vertically downwardly adjacent its outer edge to form a second vertical wall 116 which in turn is bent outwardly to form a second planar step 118 extending generally normally from the second vertical wall and adapted to support the cover 3 when assembled on the container 1.

A typical application of this form of the invention is shown generally at 21, wherein the supporting clip SD and the locking clip LD are assembled on the rim of the container 1 to retain the cover 3 in closed position. Each supporting clip SD is assembled on the container, as shown at FIG. 21, by forcing it through material of the wall such that the first vertical upstanding wall 108 extends upwardly along the outer surface of the container with the first planar step 110 extending horizontally between the inner and outer surfaces of the container wall. In this manner, the second vertical wall 116 of the clip will extend downwardly along the inner surface of the container wall and the second planar step 118 will extend outwardly to support the cover 3, when placed within the container 1.

Each locking clip LD may then be easily and quickly applied to the container by placing the resilient arms 8 and 10 on either side of the container rim with the bridge portion 12 resting on the upper surface of the rim. The indent portions 100, on the inner resilient arm 8, may be pressed into engagement with the container wall to prevent lateral displacement of the clip. The neck portion 104 is then pressed downwardly through the horizontally extending slot 114 of the supporting clip SD wherein the tab portion 106 on the neck prevents withdrawal of the latter from the supporting clip S and positively locks the cover 3 in frictional engagement between the fastening clips.

Figure 24:
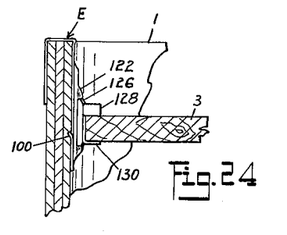
Figures 25, 26:
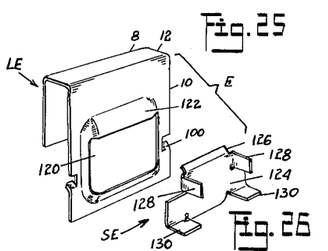
FIG. 25 is a top perspective view of the locking clip employed in FIG. 24.
FIG. 26 is a top perspective view of the supporting clip employed in conjunction with the locking clip in FIGS. 24 and 25.

FIGS. 24 through 26, inclusive, show another form of the invention, wherein the fastening devices, shown generally at E, may again comprise a generally U-shaped locking clip LE and a supporting clip SE. The U-shaped locking clip LE may again include a flat planar bridge portion 12 and two resilient arms 8 and 10 bent downwardly and normally from the bridge portion 12. The resilient arm 10 may similarly include two indent portions 100 that project inwardly toward the resilient arm 8 which act to penetrate the container wall for retaining the latter against lateral movement or displacement. In this form, the resilient arm 10 may be formed with a generally rectangular opening 120 with a countersunk or crimped edge 122 extending out of the plane of the resilient arm 10 and continuously around the periphery of the opening 120. The edge portion 122 is formed to curve outwardly and inwardly from the face of the resilient arm 10 toward the geometric center of the opening 120.

The supporting clip SE, as shown at FIG. 26 in finished form, is of an irregular shape but which similarly may be formed from a flat sheet of metal. As shown, the clip comprises a generally flat base portion 124 with two horizontally opposed flange portions 126 which bend upwardly and outwardly and are of a dimension sufficient to be secured beneath the crimped or countersunk edge 122 surrounding the opening 120 of the locking clip LE. The base portion 124 may be formed with a first pair of opposed supporting arm portions 128 which extend parallel and normally from the base portion 124. The base portion may additionally be provided with a second pair of supporting arm portions 130 which extend parallel and normally from the plane of the base portion 124 and whose planes are generally perpendicular to the planes of the first mentioned pair of supporting arm portions 128. The distance between the lower edges of the first pair of arm portions 128 and the upper surfaces of the second pair of arm portions 138 is sufficient to frictionally secure the cover 3 when the latter is assembled therebetween.

In application of this form of the invention, as shown at FIG. 24, the U-shaped locking clips LE are positioned on the rim of the container 1, as aforementioned, with the indents 100 forced into the container wall to secure the clips against lateral movement. The supporting clips SE are then positioned around the periphery of the cover and locked positively into engagement with the locking clip SE by applying pressure to the cover 3 and snapping the flanges 126 beneath the crimped edges 122 extending from the locking clip LE. In this manner, the cover 3 is held in positive frictional engagement between the two pairs of supporting arms 128 and 130 of the supporting clip SE.

Figure 27:
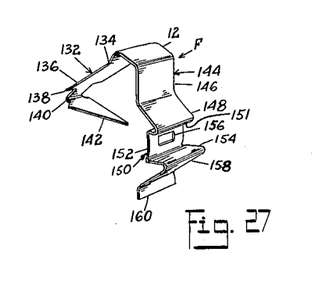
Figure 28:
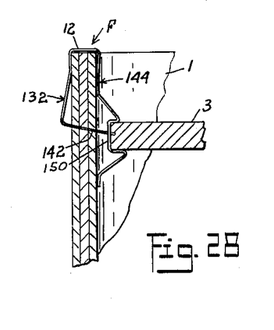

FIGS. 27 through 28, inclusive, show another form of the invention, illustrated generally at F, and of a generally U-shaped configuration. In this form, the U-shaped fastening clip may be bent to form a base portion 12 with a resilient dart-like leg portion 132 which extends downwardly along the surface at 134 and outwardly along the surface at 136 defining lateral projections 138 for bearing on the outer surface of the container wall in the applied position of the fastening clip. The reduced free end portion of said leg 132 provides a vertical abutment 140 adjoining said lateral projection 138. An inwardly extending dart portion 142 is spaced from the lateral projections 138 and of a length sufficient to pass through the container wall and into locking engagement with the cover 3 when in the applied position.

A resilient cooperating leg portion 144 is formed from the other free end portion of said fastening clip base 12 which extends angularly downwardly along its surface at 146 and angularly outwardly along its surface at 148 thus defining a generally U-shaped supporting channel 150.

The U-shaped supporting channel 150 is formed by continuing to bend the leg portion 148 inwardly along its surface at 151 and then vertically downwardly along its surface to form a bowed or curved base portion 152. The base portion 152 is then bent outwardly along a planar surface at 154 thus defining the U-shaped channel 150 therein. The bowed or curved base portion 152 of the U-shaped channel 150 is formed with an opening 156, sufficient in dimension to receive the end of the dart portion 142 when in the applied position, to retain the fastening clip in locked position on the rim of the container 1. The leg portion 144 is bent inwardly and angularly outwardly beyond the bowed or curved base portion 152, along its surface at 158 and then vertically downwardly defining a flange portion 160. The flange 160 frictionally engages the inner surface of the container 1 and acts to space the U-shaped channel 150 from the inner surface of the container 1.

In application of this form of the invention there is shown at FIG. 28, the U-shaped fastening device F positioned on the rim of the container 1, as aforementioned with respect to other forms of the invention. The cover 3, in this form, is then supported within the U-shaped channel 150. Pressure is then applied to the dart-like portion 132 causing the dart portion 142 to penetrate through the container wall and into frictional engagement within the opening 156 in the base portion 152 of the U-shaped channel 150, thus automatically and positively locking the cover 3 within the container 1 when in the applied position.

Figure 29:
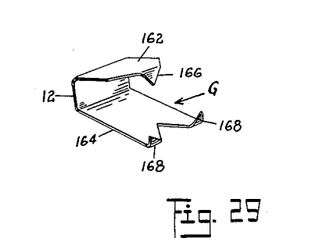
Figure 30:
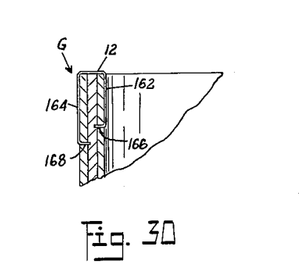

FIGS. 29 through 30, inclusive, show another form of the invention, illustrated generally at G of a generally U-shaped configuration. In finished form, the U-shaped fastening clips may be bent to define a base portion 12 with inner and outer opposed resilient leg portions 162 and 164, respectively, which diverge outwardly from the base portion 12. As shown, the inner resilient leg portion 162 is bent adjacent its outer end to form an indent portion 166 which acts to penetrate the inner surface of the container when in the applied position, to prevent displacement of the fastening clips. The outer resilient leg 164 is formed adjacent its outer end in the shape of a V defining a pair of indent portions 168 at the tips of the V which extend inwardly and horizontally when in the applied position. The indent portions 168 thus penetrate the outer surface of the container to thereby additionally secure the fastening clips against displacement.

In application of this form of the invention, as shown at FIG. 30, the U-shaped fastening clips are positioned on the rim of the container 1, wherein the indents 168 and 166 are forced inwardly to retain the ends of the flat sheets of kraft paperboard or the like as they are formed into cylindrical tobacco hogsheads or the like. It will be noted, that the spaced indents 168, which engage the outer surface of the container, each act to penetrate an end of a flat sheet of the kraft paperboard or the like which form the cylindrical tobacco hogshead or the like. Moreover, the indents 168 thus positively act to lock the sheets against their spreading apart when formed into the desired cylindrical shape.

Figure 31:
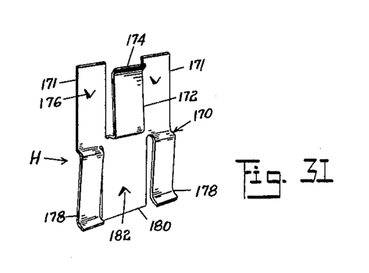
Figure 32:
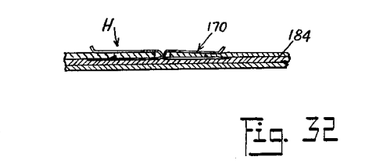

FIGS. 31 and 32, inclusive, show another form of the invention illustrated generally at H, which is in the form of a clip constructed of sheet metal defining a body or base portion 170. The body portion 170 may be provided at one end with a first pair of longitudinal slits defining a spring arm 172 between the side portions 171 of the body portion and spaced from the plane of the body portion 170 a distance sufficient to frictionally engage the end of a reinforcing strip when in applied position. The spring arm 172 is free at one end and may be generally flared as at 174 to facilitate insertion of the reinforcing strip therebetween. The side portions 171 may be provided with upstanding indents 176 which act to secure the reinforcing strips when inserted beneath the spring arm 172.

The opposite end of the body portion 170 may be provided with a second pair of slits defining two additional spring arms 178 on either side of an intermediate base portion 180 and spaced from the plane of the base portion a distance sufficient to frictionally engage the corresponding end of a reinforcing strip, when in applied position around the container. The intermediate base portion 180 may be formed with an upstanding indent 182 which functions in the same manner as indent 176.

In application of this form of the invention, as shown at FIG. 32, one end of the fastening clip 170 is secured to an end of a reinforcing strip of kraft paperboard or the like, shown generally at 184. The reinforcing strip 184 is then formed around the outer surface of a cylindrical tobacco hogshead or the like with its free end secured by frictional engagement with the opposite end of the clip 170. In this manner, the reinforcing strip 184 is positively locked about the outer surface of the cylindrical tobacco hogshead or the like and acts to prevent damage through buckling or twisting, when prepared for shipment or the like.

While the invention has been described in detail with specific examples, such examples are intended as illustrations only, inasmuch as it will be apparent that other modifications in the construction, arrangement and general combination of parts may be devised without departing from the spirit and scope of the invention. For example, the fastening devices of FIGS. 21–26 may be provided with the modified forms of the buckle-like flange 54 when it is desired to extend the interior supporting straps between upper and lower fastening devices thereby providing additional means for retaining the devices on the side of the container or when it is desired to prevent buckling of the cover when used in conjunction with the reinforcing clips R. In this respect, it is to be understood that the buckle-like flange 54 may be used where it is not desired to reinforce the cover. In the latter case, the arm 54 is used to connect upper and lower pairs of fastening devices by means of the interior supporting straps 6. Accordingly, any of the fastening devices may be connected in pairs by means of the interior straps 6 for retaining the fastening devices on the side of the hogshead or the fastening devices may be used with the interior straps 6 in conjunction with the reinforcing clips R when it is desired to additionally support the covers against distortion. The present embodiments are therefore to be considered in all respects as illustrative and not restrictive, the scope of the invention being indicated by the appended claimed subject matter rather than by the foregoing description, with all changes falling within the scope, meaning and range of equivalency of the claims intended to be embraced therein.

I claim:

1. A fastening device for retaining a cover or the like in closed position on a container, comprising a generally U-shaped supporting clip, said supporting clip including a pair of spaced legs extending downwardly from a base portion, one of said legs having outwardly projecting means adapted to receive in supporting relation a cover when applied to said container, and a detachable generally U-shaped locking clip disposed generally normal to the general vertical plane of said supporting clip and engageably coacting with said supporting clip and with the confronting upper surface of said cover when positioned on said cover for retaining the latter in closed position thereon, said locking clip including a pair of resilient arms extending angularly outwardly from one another in the direction of said supporting clip, one of said resilient arms being pivotally movable relative to the other of said arms for interlocking underlying engagement with said supporting clip, and the other of said resilient arms engaging the confronting surface of said cover throughout a substantial portion of its length for retaining the latter in supported relation between said arm and the projecting means on said supporting clip.

2. A fastening device for retaining a cover or the like in closed position on a container, comprising a generally U-shaped supporting clip, said supporting clip including a pair of legs extending downwardly from a base portion, said legs being spaced apart a sufficient distance to receive an edge portion of said container therebetween, one of said legs being bent outwardly to provide a generally planar surface to receive in supporting relation a cover thereon when applied to said container, a generally U-shaped locking clip disposed generally normal to the general vertical plane of said supporting clip and engageably coacting with said supporting clip and with the confronting upper surface of said cover when positioned on said cover for retaining the latter in closed position thereon, said locking clip including a pair of resilient arms extending angularly outwardly from one another in the direction of said supporting clip, one of said resilient arms being pivotally movable relative to the other of said arms and including upturned means adjacent its free end thereof for interlocking underlying engagement with said supporting clip, said other resilient arm including downwardly extending flange means adjacent the free end thereof and disposed intermediate said container and a leg of said supporting clip for retaining the locking clip in its assembled position on said cover, and said last mentioned resilient arm engaging the confronting surface of said cover throughout a substantial portion of its length for retaining said cover in supported relation between said arm and the planar surface on said supporting clip.

3. A fastening device in accordance with claim 2, wherein one of the legs of said supporting clip includes a buckle-like portion disposed below said planar surface for engageably retaining therein a supporting strap associated interiorly with said cover for preventing buckling of the latter when in the closed position on the container.

4. A fastening device for retaining a cover or the like in closed position on a container, comprising a generally U-shaped supporting clip, said supporting clip including a pair of spaced legs extending downwardly from a base portion, one of said legs having an outwardly extending projection means adapted to receive in supporting relation a cover when applied to the container, said last mentioned leg including a retaining means disposed below said projecting means adjacent one end thereof and adapted to engageably retain therein a supporting strap associated interiorly with said cover for preventing buckling of the latter when in a closed position on said container, and a detachable generally U-shaped locking clip disposed generally normal to the general vertical plane of said supporting clip and engageably coacting with said supporting clip and with the confronting upper surface of said cover when positioned on said cover for retaining the latter in closed position thereon, said locking clip including a pair of resilient arms extending angularly outwardly from one another in the direction of said supporting clip, one of said resilient arms being pivotally movable relative to the other of said arms for interlocking underlying engagement with said supporting clip and the other of said resilient arms engaging the confronting surface of said cover throughout a substantial portion of its length for retaining the latter in supported relation between said arm and the projecting means on said supporting clip.

5. A fastening device in accordance with claim 4, wherein said retaining means includes a buckle-like flange having a slot which opens outwardly onto an edge of said flange and being of a dimension sufficient to frictionally retain a supporting strap therein.

6. A fastening device in accordance with claim 5, wherein said flange is provided with a resilient arm extending transversely across said slot and raised from the plane of said flange a sufficient distance for frictionally retaining a supporting strap therein.

7. A fastening device for retaining a cover or the like in closed position on a container, comprising a supporting clip, said supporting clip including a pair of legs extending downwardly from a base portion and defining a generally U-shaped configuration therewith, said legs being spaced apart a sufficient distance to be positioned over an edge portion of said container, one of said legs disposed interiorly of said container and including an outwardly extending shoulder portion for receiving in supporting relation a cover when positioned on said container, and a downwardly extending shank portion of lesser width compared to said shoulder portion connecting the latter to said leg, a generally U-shaped locking clip engageably coacting with said supporting clip and with the confronting upper surface of said cover when positioned on said cover for retaining the latter in closed position on said container, said locking clip including a pair of resilient arms diverging outwardly from one another in the direction of said supporting clip, one of said resilient arms being pivotally movable relative to the other of said arms and including a cut-out flange portion extending downwardly in the general direction of extension of said shank portion for limiting relative movement of said locking clip, said cut-out flange portion defining a pair of upturned means spaced on either side thereof, said upturned means being adapted for interlocking engagement with said supporting clip on either side of said shank portion upon pivotal movement of said resilient arm, and the other of said resilient arms being biased against the confronting surface of said cover for retaining the latter in supported relation between said arm and the shoulder portion on said supporting clip.

8. A fastening device in accordance with claim 7, wherein the last mentioned of said resilient arms includes a pair of spaced apart flange portions extending downwardly in the general direction of extension of said shank portion, said flange portions being disposed intermediate the inner surface of said container and the interiorly extending leg of said supporting clip for retaining the locking clip in its assembled position on said cover.

9. A fastening device in accordance with claim 7, wherein one of the legs of said supporting clip includes a buckle-like means disposed below said shoulder portion and engageably retaining therein a supporting strap associated interiorly with said cover for preventing buckling of the latter when in the closed position on said container.

10. A fastening device for retaining a cover or the like in closed position on a container, comprising a generally U-shaped supporting clip including a pair of spaced legs extending downwardly from a base portion, one of said legs having an outwardly projecting generally planar shoulder portion to receive in supporting relation a cover when applied to said container, and a detachable generally U-shaped locking clip engageably coacting with said supporting clip and with the confronting upper surface of said cover when positioned thereon for retaining the latter in closed position on said container, said locking clip including a pair of resilient arms extending angularly outwardly from one another in the general direction of said supporting clip, one of said resilient arms being disposed for interlocking underlying coacting engagement with said supporting clip, and the other of said resilient arms being disposed for coacting engagement with the confronting upper surface of said cover in the assembled position thereof.

11. A fastening device in accordance with claim 10, wherein one of the respective resilient arms of said locking clip includes a pair of spaced detent means disposed for interlocking underlying coacting engagement with one of the respective legs of said supporting clip, and the other of said resilient arms including a pair of spaced downwardly extending leg portions having retaining means thereon for coacting engagement with the underside of said shoulder portion to prevent movement of said locking clip relative to said supporting clip in the assembled position thereof.

12. A fastening device in accordance with claim 11, wherein the respective one of the resilient arms of said locking clip includes a flange portion disposed intermediate said detent means and projecting downwardly therefrom and between the respective leg of said supporting clip and said cover to prevent relative movement between said locking clip and said supporting clip in the assembled position thereof.

13. A fastening device in accordance with claim 10, wherein one of the respective legs of said supporting clip includes a buckle-like flange disposed below said shoulder portion, said flange having a slot opening onto one edge thereof for receiving an interior supporting strap therethrough.

14. A fastening device in accordance with claim 10, wherein one of the respective legs of said supporting clip includes a buckle-like flange disposed below said shoulder portion, said flange having an elongated slot opening onto one edge thereof, and an integral resilient arm raised from and extending over said slot for frictionally retaining an interior supporting strap passed through said slot.

15. A fastening assembly for retaining a cover or the like in closed position on a container, and for supporting a cover or the like against buckling when in the closed position on a container comprising, a plurality of supporting clips disposed in spaced relation on the rim of a container and supporting a cover in closed position on said container, a locking clip engageably coacting with each one of the respective of said supporting clips and with the confronting upper surface of said cover for retaining the latter in closed position on said container, each of said supporting clips including a buckle-like means disposed below said cover and extending interiorly of said container, and a supporting strap engageably retained adjacent its free ends by the buckle-like means of an associated pair of oppositely disposed and longitudinally spaced supporting clips for preventing buckling of the cover when in the closed position on said container.

16. A fastening means according to claim 15, wherein said buckle-like means comprise a flange having a slot which opens outwardly onto an edge of the flange and of a dimension sufficient to frictionally retain an interior supporting strap therein when in the applied position.

17. Fastening device according to claim 16, wherein the said flange is provided with a resilient buckle-like arm extending transversely across said slot and raised from the plane of the flange a sufficient distance for frictionally retaining an interior supporting strap when in the applied position therein.

References Cited by the Examiner
UNITED STATES PATENTS

| | | | |
|---|---|---|---|
| 648,012 | 4/1900 | Wilton | 217—89 |
| 922,292 | 5/1909 | King | 217—89 |
| 1,307,351 | 6/1919 | Ford | 229—5.7 |
| 1,430,420 | 9/1922 | Walker | 217—89 |
| 1,690,824 | 11/1928 | Kondolf | 229—47 X |
| 2,052,489 | 8/1936 | Purdy | 217—89 |
| 2,241,210 | 5/1941 | Luckett | 217—89 X |
| 2,351,525 | 6/1944 | Leary. | |
| 2,503,222 | 4/1950 | Simons | 217—89 |

WILLIAM FELDMAN, *Primary Examiner.*

ABRAHAM G. STONE, DONLEY J. STOCKING,
*Examiners.*